(12) United States Patent
Hontz et al.

(10) Patent No.: US 11,820,516 B2
(45) Date of Patent: Nov. 21, 2023

(54) SEAT SYSTEM HAVING A ROTARY RECLINE LEVER

(71) Applicant: HAECO Americas, LLC, Greensboro, NC (US)

(72) Inventors: Jeffrey Walter Hontz, Winston-Salem, NC (US); Joseph James Mauro, Winston-Salem, NC (US)

(73) Assignee: HAECO Americas, LLC, Greensboro, NC (US)

( * ) Notice: Subject to any disclaimer, the term of this patent is extended or adjusted under 35 U.S.C. 154(b) by 131 days.

(21) Appl. No.: 17/599,121

(22) PCT Filed: Mar. 30, 2020

(86) PCT No.: PCT/US2020/025640
§ 371 (c)(1),
(2) Date: Sep. 28, 2021

(87) PCT Pub. No.: WO2020/205692
PCT Pub. Date: Oct. 8, 2020

(65) Prior Publication Data
US 2022/0169392 A1 Jun. 2, 2022

Related U.S. Application Data

(60) Provisional application No. 62/827,316, filed on Apr. 1, 2019.

(51) Int. Cl.
*B64D 11/06* (2006.01)
(52) U.S. Cl.
CPC ........ *B64D 11/064* (2014.12); *B64D 11/0638* (2014.12)

(58) Field of Classification Search
CPC .......................... B64D 11/064; B64D 11/0638
See application file for complete search history.

(56) References Cited

U.S. PATENT DOCUMENTS

| 3,145,052 A | 8/1964 | Morgan |
| 5,102,372 A | 4/1992 | Patterson et al. |
| 6,481,798 B2 | 11/2002 | Romca et al. |
| 6,669,295 B2 | 12/2003 | Williamson |

(Continued)

FOREIGN PATENT DOCUMENTS

WO    WO 2017/218240    12/2017

OTHER PUBLICATIONS

International Search Report for PCT Application No. PCT/US2020/025640 dated Jun. 29, 2020.

(Continued)

*Primary Examiner* — Anthony D Barfield
(74) *Attorney, Agent, or Firm* — MacCord Mason PLLC (57) ABSTRACT

A seat system for a passenger aircraft. The seat system includes a passenger seat frame having a backrest support assembly including a backrest and a spreader; and a seat bottom support assembly. The seat system further includes a rotary recline lever assembly including an armrest connected to the spreader; an offset rotary actuator positioned within the armrest; and a release cable attached between the rotary actuator and the backrest support assembly. The seat system may further include a seat back tray table attached to the back of the passenger seat frame.

17 Claims, 8 Drawing Sheets

(56) References Cited

U.S. PATENT DOCUMENTS

| | | | |
|---|---|---|---|
| 6,749,266 B2* | 6/2004 | Williamson | B64D 11/064 |
| | | | 297/452.2 |
| 7,182,402 B1 | 2/2007 | Ahad | |
| 8,931,847 B2 | 1/2015 | Cailleteau et al. | |
| 9,656,583 B2 | 5/2017 | Gaither et al. | |
| 10,173,778 B2 | 1/2019 | Senneff et al. | |
| 10,279,917 B1* | 5/2019 | Wilkey | |
| 10,967,773 B2* | 4/2021 | Vela | B64D 11/064 |
| 11,040,775 B2* | 6/2021 | Wong | |
| 2003/0094840 A1 | 5/2003 | Williamson | |
| 2015/0274038 A1 | 10/2015 | Garing | |
| 2018/0312084 A1* | 11/2018 | Does | B64D 11/064 |

OTHER PUBLICATIONS

Written Opinion for PCT Application No. PCT/US2020/025640 dated Jun. 29, 2020.

\* cited by examiner

SEAT SYSTEM HAVING A ROTARY RECLINE LEVER

REFERENCE TO PRIOR APPLICATIONS

This application claims the benefit of PCT Application No. 20/025640, filed Mar. 30, 2020, which claims be benefit of U.S. Provisional Application No. 62/827,316, filed Apr. 1, 2019, and are hereby incorporated by reference in their entireties.

BACKGROUND OF THE INVENTIONS

(1) Field

The present inventions relates generally to seat systems for passenger vehicles and, more particularly, to a seat system for a passenger aircraft.

(2) Related Art

Most commercial aircraft passenger seats are designed to recline several inches from the full upright position for passenger comfort. Traditionally, seat back recline is accomplished by a spring-loaded hydraulic device known as a "recline lock". The recline lock is controlled by a shielded release cable connected to a mechanical push button, which is usually mounted on a seat armrest.

To recline the seat, the passenger presses the button and leans back on the seat. The button pulls the release cable, which actuates a lever at the other end that opens the hydraulic valve in the recline lock, allowing it to compress and thus allow the seat to recline.

If the passenger wants to return the seatback to the upright position, he or she again presses the button and leans forward. The valve on the recline lock will again be opened, allowing the internal spring to expand the recline lock and move the seatback forward.

One example of a seat recline control is shown in U.S. Pat. No. 7,182,402 issued Feb. 27, 2007 to Ahad which is hereby incorporated by reference in its entirety. One example of a seat recline locking assembly is shown in U.S. Pat. No. 6,669,295 issued Dec. 30, 2003 to Williamson which is hereby incorporated by reference in its entirety. Another example of a seat recline locking assembly is shown in U.S. Pat. No. 3,145,052 issued Jan. 24, 1963 to Morgan which also is hereby incorporated by reference in its entirety The air travel industry is highly price competitive and has generally divided its passengers from First Class and Coach into First Class, Coach and Economy. More recently, as the air travel industry has further expanded its Economy class, it has worked with its manufacturers to reduce passenger seat weight to both increase passenger load and to reduce fuel costs. However, conventional seat recline mechanisms are heavy levered arrangements to accommodate the movement of the arm rests, to provide durability over the projected long life of the interior and to be easily operated by both children and the elderly. Modern Economy seats have very limited structure to house these older mechanisms.

Thus, there remains a need for a seat system having an improved rotary recline lever assembly which is both compact and durable while, at the same times, remains easy for all passengers to operate without excessive force.

SUMMARY OF THE INVENTIONS

The present inventions are directed to a seat system for a passenger aircraft. The seat system includes a passenger seat frame having a backrest support assembly including a backrest and a spreader; and a seat bottom support assembly. The seat system further includes a rotary recline lever assembly including an armrest connected to the spreader; an offset rotary actuator positioned within the armrest; and a release cable attached between the rotary actuator and the backrest support assembly. The seat system may further include a seat back tray table attached to the back of the passenger seat frame.

In one embodiment, the armrest includes a lower body and an arm cap. The lower portion of the arm cap may interlock with the upper portion of the lower body. In addition, the arm cap may be removably attached to the upper portion of the lower body by a fastener for easy access if maintenance was required.

The rotary actuator portion operated by the user may be offset from the center of rotation of the actuator to provide a mechanical advantage to the user. In one embodiment, the mechanical advantage of the offset rotary actuator is between about 1½ and about 3. In another embodiment, the mechanical advantage of the offset rotary actuator is about 2.

Also, the rotary actuator may include a low friction, square wave bushing to provide reduced force requirement to the user. In one embodiment, the low friction, square wave bushing includes a contact surface between about 25% and about 75% with respect to the shaft of its rotation. In another embodiment, the low friction, square wave bushing includes a contact surface of about 50%.

In one embodiment, the rotary actuator further includes a pair of curved tabs to retain the proximate end of the release cable when the rotary actuator is operated by the user. Also, the rotary actuator may further include a grooved slot adjacent to the pair of curved tabs to receive the release cable for crimped end movement to reduce side friction of the cable with its conduit when the rotary actuator is operated by the user.

The rotary actuator may further include at least one mechanical stop to prevent over backwards rotation of the rotary actuator when the actuator is released by the user.

Also, the release cable may further include an outer protective jacket and a crimp on the proximate end of the release cable for engagement with the rotary actuator.

The seat back tray table attached to the back of the passenger seat frame may be movable between a first storage position and a second deployed position. In one embodiment, a lock mechanism is attached to the back of the passenger seat frame for retaining the seat back tray table in a secured position.

In one embodiment, the passenger seat further includes a display attached to the back of the passenger seat. The display may be adjoined by the back of the passenger seat.

A backrest cushion may be attached to the backrest support assembly. The backrest support assembly may further include a headrest. In one embodiment, the headrest is adjustable to accommodate for the height of a passenger.

The passenger seat may further include an upholstered package. In addition, the passenger seat may further include a trim package.

Accordingly, one aspect of the present inventions is to provide a seat system for a passenger aircraft, the seat system including (a) a passenger seat frame having a backrest support assembly including a backrest and a spreader; and a seat bottom support assembly; and (b) a rotary recline lever assembly including an armrest connected to the spreader; a rotary actuator positioned within the armrest; and a release cable attached between the rotary actuator and the backrest support assembly.

Another aspect of the present inventions is to provide in a seat system for a passenger aircraft wherein the seat system includes a passenger seat frame having a backrest support assembly including a backrest and a spreader and a seat bottom support assembly, the improvement comprising a rotary recline lever assembly, the rotary recline lever assembly including an armrest connected to the spreader; an offset rotary actuator positioned within the armrest; and a release cable attached between the rotary actuator and the backrest support assembly.

Still another aspect of the present inventions is to provide a seat system for a passenger aircraft, the seat system including (a) a passenger seat frame having a backrest support assembly including a backrest and a spreader; and a seat bottom support assembly; (b) a rotary recline lever assembly including an armrest connected to the spreader; an offset rotary actuator positioned within the armrest; and a release cable attached between the rotary actuator and the backrest support assembly; and (c) a seat back tray table attached to the back of the passenger seat frame.

These and other aspects of the present inventions will become apparent to those skilled in the art after a reading of the following description of the preferred embodiment when considered with the drawings.

DESCRIPTION OF THE EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
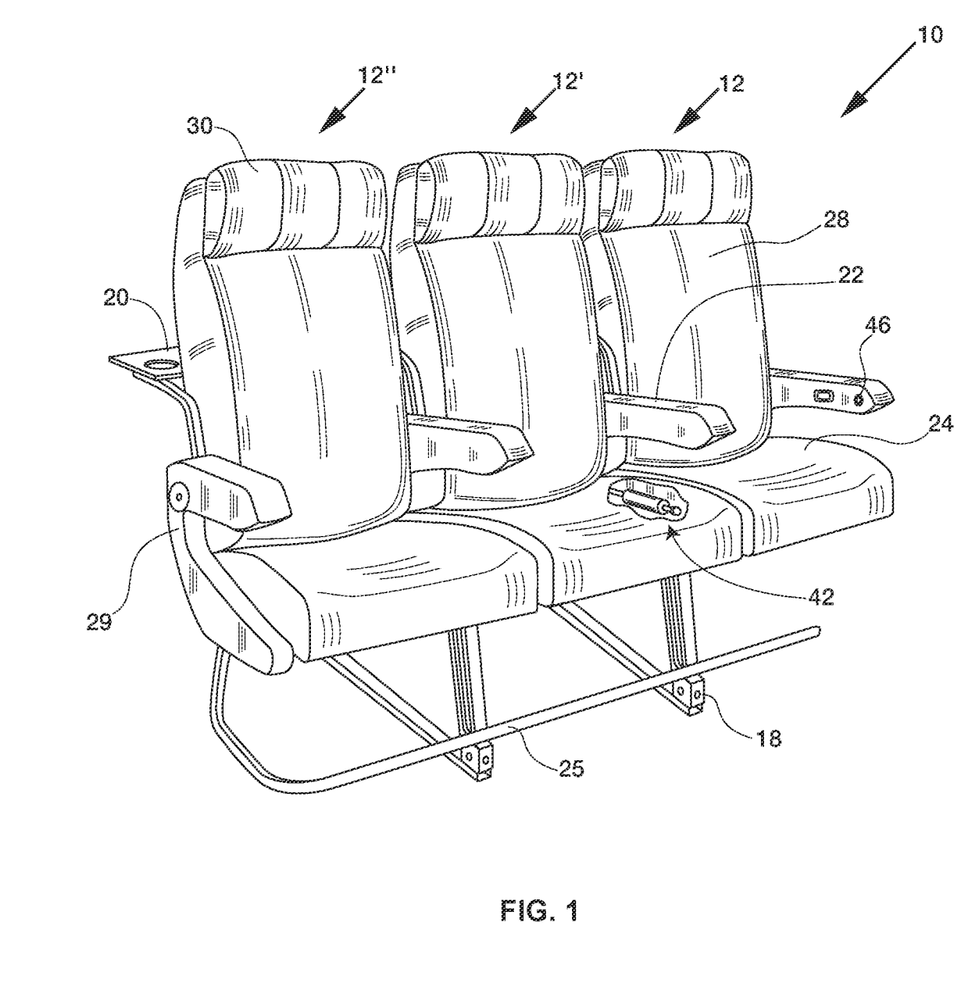
FIG. 1 is a front perspective view of one embodiment of a seat system having a rotary recline lever constructed according to the present inventions.

Referring now to the drawings in general and FIG. 1 in particular, it will be understood that the illustrations are for the purpose of describing a preferred embodiment of the inventions and are not intended to limit the inventions thereto. As best seen in FIG. 1, a seat system, generally designated 10, is shown constructed according to the present inventions. The seat system 10 includes at least one passenger seat 12 having a seat back 28 and a recline control device 42 for selectively reclining the seat back.

The seat 12 includes a seat base frame 18, a baggage bar 25 for retaining baggage below the seat base frame 18 and an armrest 22. The seating system 10 may further include a seat back tray table 20 attached to the seat back 28. FIG. 1 also shows the rotary actuator 46 for controlling the seat recline control device attached to the backrest support assembly 26.

Figure 2:
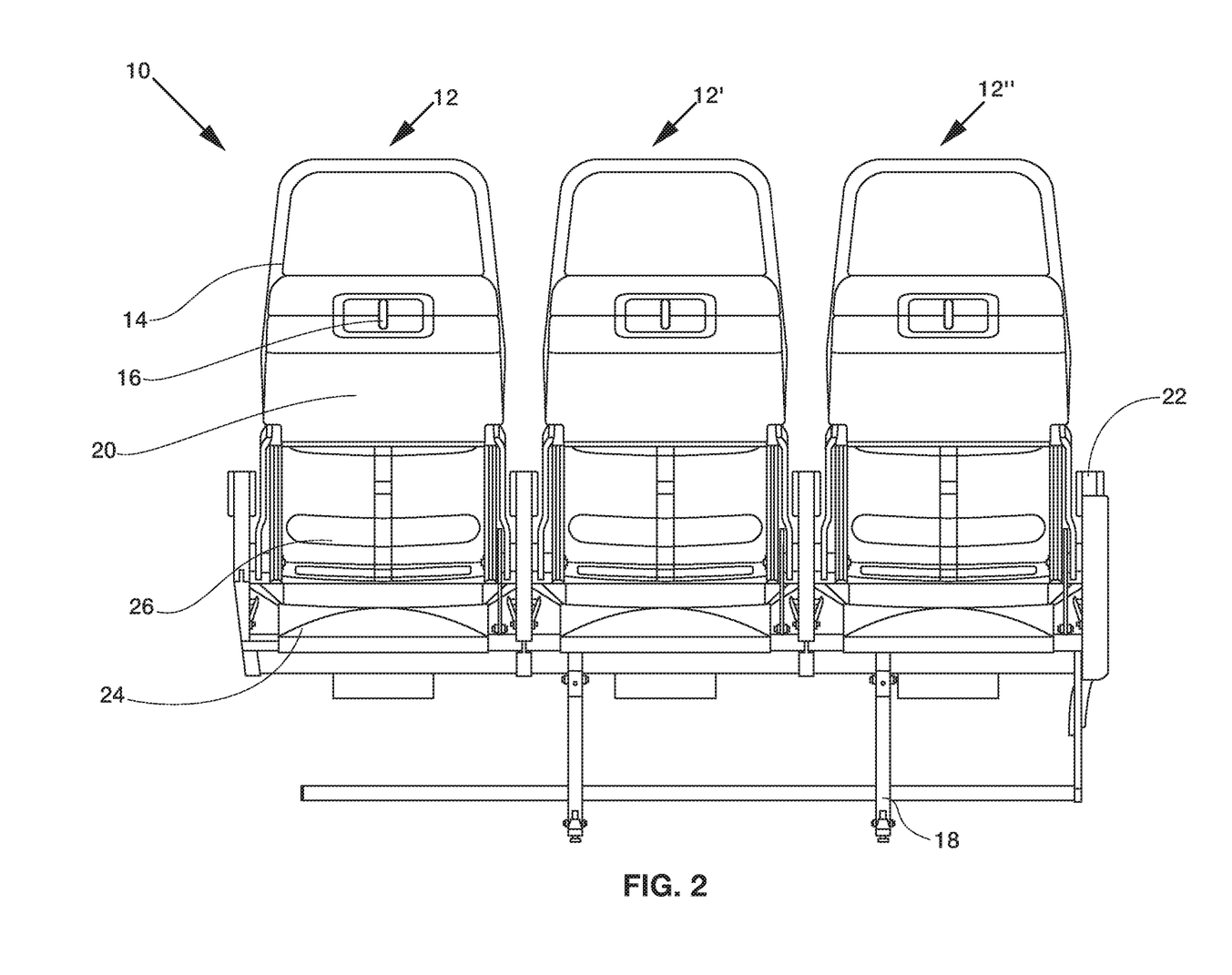
FIG. 2 is a rear elevation view of the seat system shown in FIG. 1.

Turning to FIG. 2, there is shown a rear elevation view of the seat system 10 shown in FIG. 1. Each of the passenger seats 12 include a seat bottom support assembly 24 attached to the seat base frame 18 and also a backrest support assembly 26 attached to the seat base frame 18 adjoining the seat bottom support assembly 24.

The backrest support assembly 26 may further include a headrest 30. In one embodiment headrest 30 is adjustable to accommodate the height of a passenger. The backrest support assembly 26 includes a backrest 28 that may tilt with respect to spreader 29 and armrest 22.

A seat back bezel 14 may be attached to the back of the passenger seat 12. The seat back bezel 14 may adjoin a seat back tray table 20 attached to the back of passenger seat 12.

Figure 3:
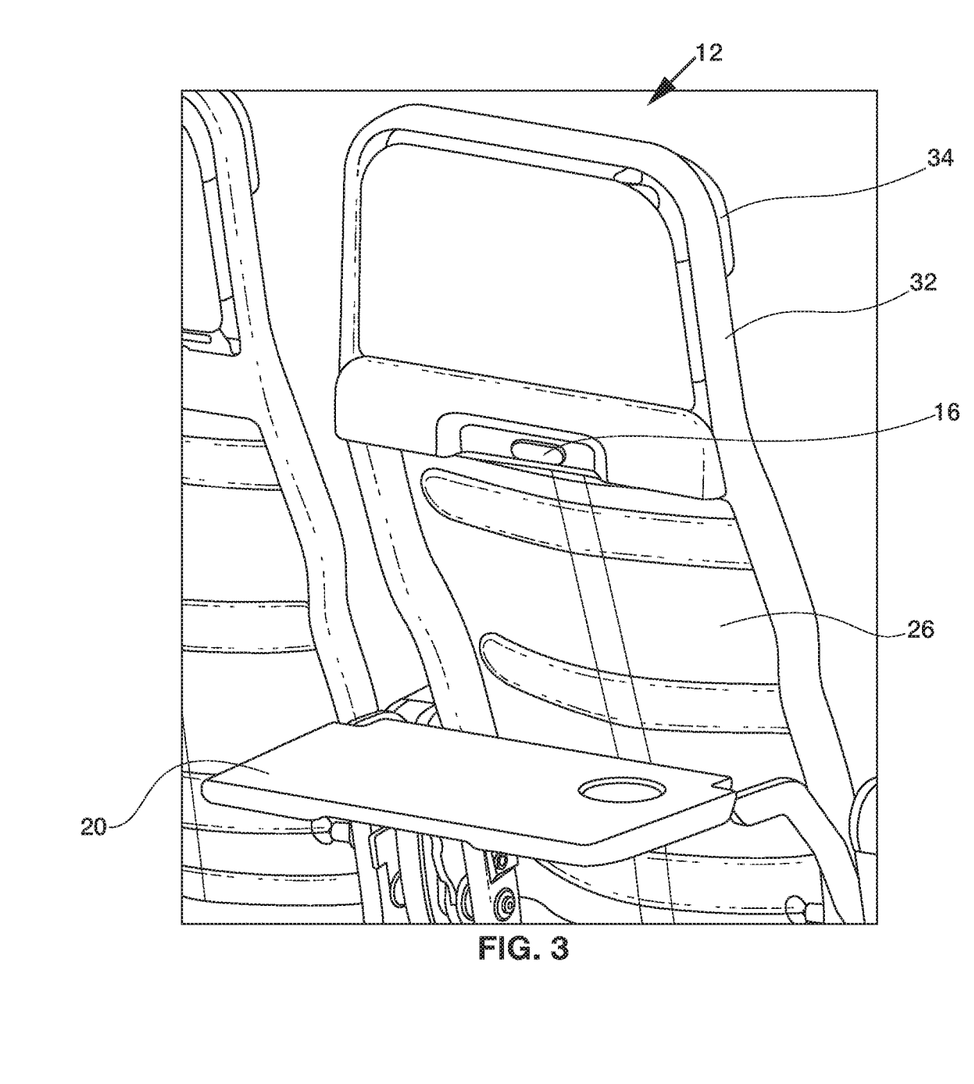
FIG. 3 is an enlarged back perspective view of FIG. 2 with the seat back tray deployed.

As best seen in FIG. 3, the seat back tray table 20 attached to the back of the passenger seat 12 is movable between its first storage position and a second deployed position. A lock mechanism 16 attached to the back of the seat back bezel 14 is adapted to retain the seat back tray table 20 in its secured position.

The passenger seat 12 normally has a headrest closeout panel such as shown in FIGS. 2 and 3 but other embodiments may further include a display attached to the back of the passenger seat 12. The display may adjoin the seat back bezel 14. The passenger seat 12 may further include an upholstery package generally designated 32 and may also include a trim package generally designated 34.

Figure 4:
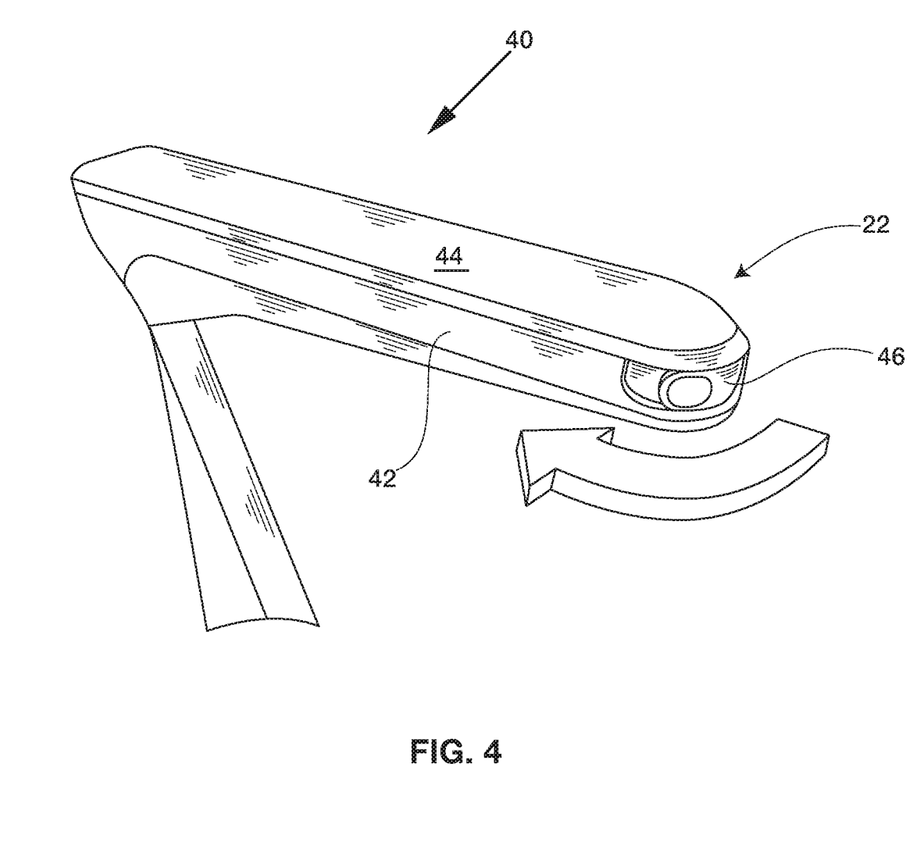
FIG. 4 is an enlarged perspective view of the rotary recline lever assembly housed in an armrest.

Turning now to FIG. 4, there is shown an enlarged perspective view of the rotary recline lever assembly 40 housed in an armrest 22. The armrest 22 may include a lower body 42 and an arm cap 44. In one embodiment, the lower portion of the arm cap 44 interlocks with the upper portion of the lower body 42. In another embodiment, the arm cap 44 is removably attached to the upper portion of the lower body 42 by a hidden fastener for easy access if maintenance is required.

Figure 5:
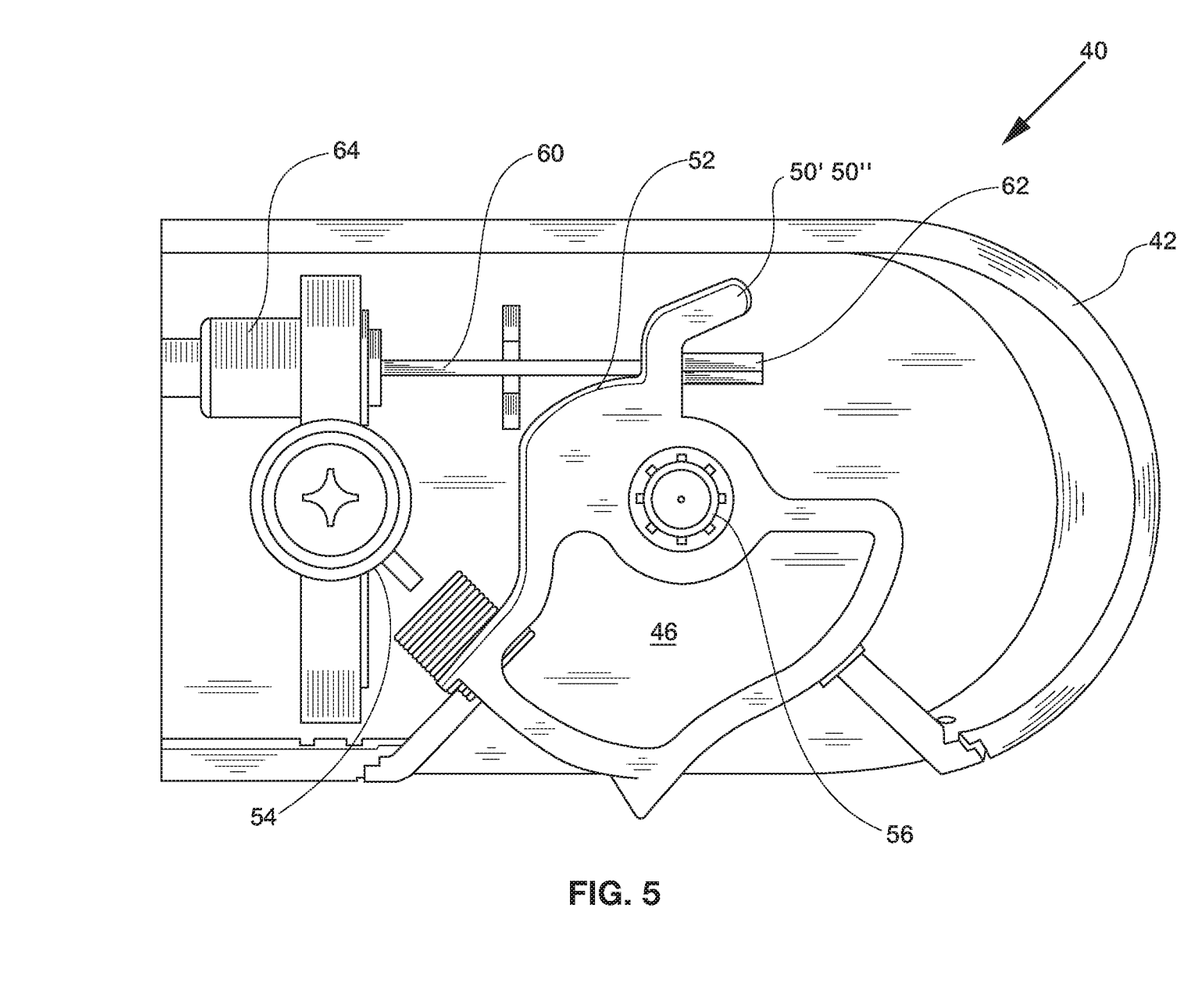
FIG. 5 is an enlarged top plan view of one embodiment of an offset rotary actuator for the rotary recline lever assembly housed in an armrest in its neutral position.

As best seen in FIG. 5, there is shown one embodiment of the rotary actuator 46 for the rotary recline lever assembly 40 housed in armrest 22 in its neutral position. The rotary actuator 46 portion operated by the user may be offset from the center of rotation of the actuator to provide a mechanical advantage to the user. In one embodiment, the mechanical advantage of the offset rotary actuator 46 is between about 1½ and about 3. In another embodiment, the mechanical advantage of the offset rotary actuator 46 is about 2.

Also, the rotary actuator 46 may include a low friction, square wave bushing 56 to provide reduced force requirement to the user. In one embodiment, the low friction, square wave bushing 56 includes a contact surface between about 25% and about 75% with respect to the shaft of its rotation. In another embodiment, the low friction, square wave bushing includes a contact surface of about 50%.

The rotary actuator 46 may further include a pair of curved tabs 50', 50" to retain the proximate end of the release cable 60 when the rotary actuator 46 is operated by the user. Also, the rotary actuator 46 may further include a grooved slot 52 adjacent to the pair of curved tabs 50', 50" to receive the release cable 60 for crimped end movement to reduce side friction of the cable with its conduit when the rotary actuator 46 is operated by the user.

The rotary actuator may further include at least one mechanical stop 54 to prevent over backwards rotation of the rotary actuator 46 when the actuator is released by the user.

Also, the release cable 60 may further include an outer protective jacket 64 and a crimp 62 on the proximate end of the release cable 60 for engagement with the rotary actuator 46.

Figure 6:
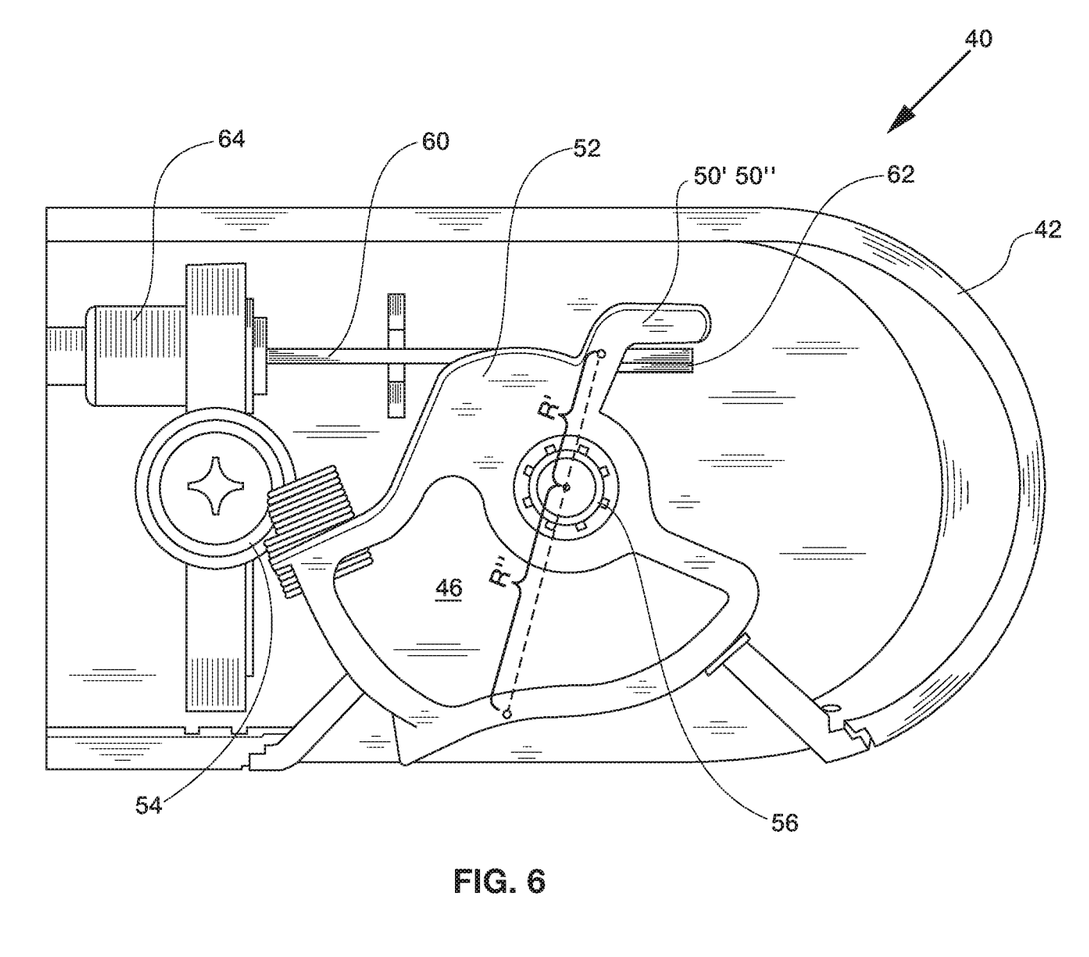
FIG. 6 is an enlarged top plan view of the offset rotary actuator for the rotary recline lever assembly show in FIG. 5 in its release position.

FIG. 6 is an enlarged top plan view of the offset rotary actuator for the rotary recline lever assembly show in FIG. 5 in its release position.

Figure 7:
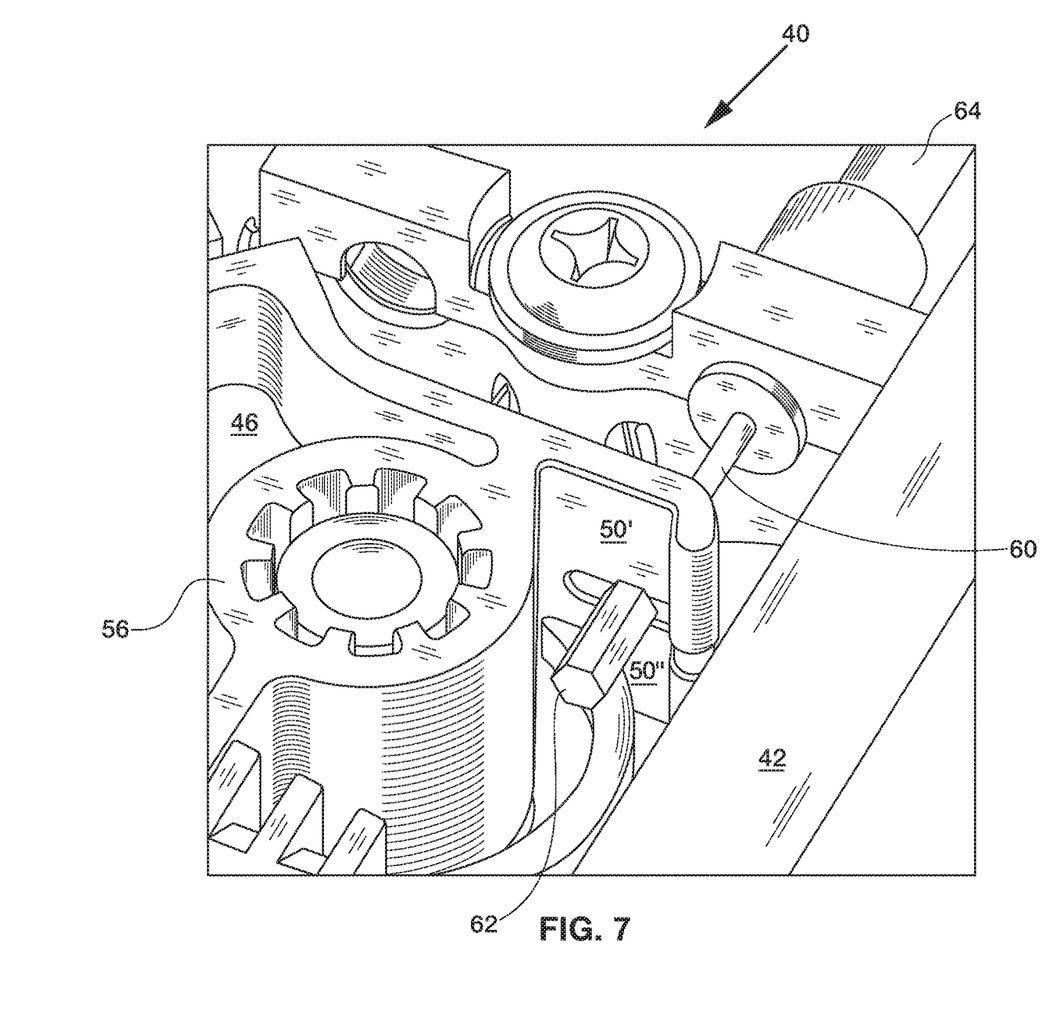
FIG. 7 is an enlarged perspective view of the rotary actuator of the rotary recline lever assembly housed in an armrest illustrating the pair of curved tabs for retaining the proximate end of the release cable.

FIG. 7 is an enlarged perspective view of the rotary actuator 46 of the rotary recline lever assembly 40 housed in armrest 22 illustrating the pair of curved tabs 50', 50" for retaining the proximate end of the release cable 60.

Figure 8:
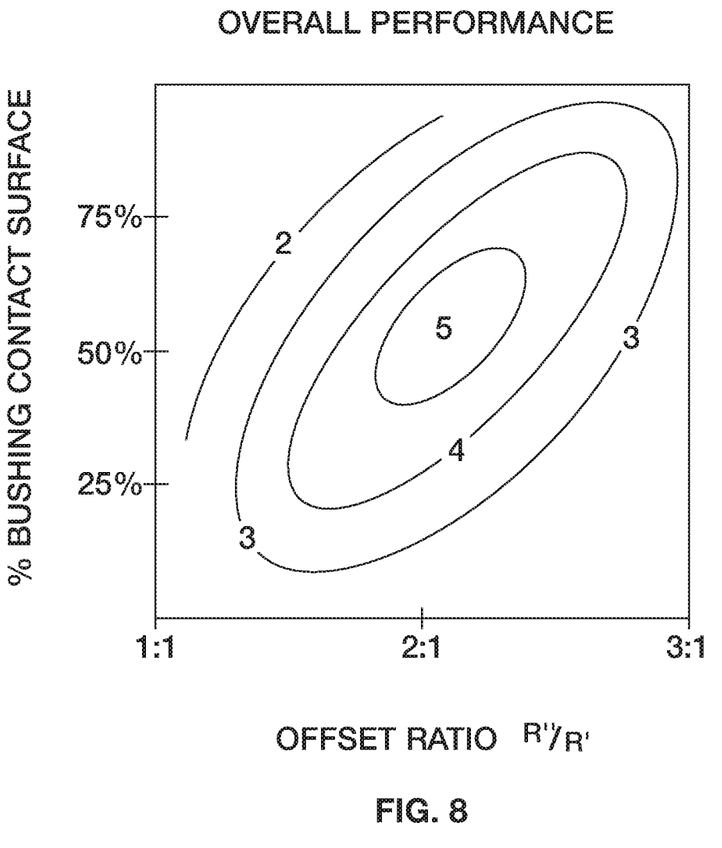
FIG. 8 is a contour plot of a response surface graphically illustrating the overall performance of ease of operation and stability of the rotary recline lever assembly constructed according on a scale of 1-5 as a function of the mechanical advantage of the rotary actuator and the percent contact surface of the square wave bushing.

Finally, FIG. 8 is a contour plot of a response surface graphically illustrating the overall performance of ease of operation and stability of the rotary recline lever assembly 40 on a scale of 1-5 as a function of the mechanical advantage of the rotary actuator 46 and the percent contact surface of the square wave bushing 56. The response surface provides a visual illustration of the effects of both the mechanical advantage of the rotary actuator and the percent contact surface of the square wave bushing 56 via a two-dimensional surface plot of a three-dimensional surface. As can be seen, there is a range where both ease of use and actuator stability exist.

Certain modifications and improvements will occur to those skilled in the art upon a reading of the foregoing description. By way of example, the rotary recline lever assembly disclosed herein may be used to release the leg rest as well as the seat back Also, the rotary recline lever assembly may be flipped in order to be in one armrest or the other. It may also be mirrored for applications where "pulling" is more appropriate to the user than "pressing". It should be understood that all such modifications and improvements have been deleted herein for the sake of conciseness and readability but are properly within the scope of the following claims.

We claim:

1. A seat system for a passenger aircraft, said seat system comprising:
    (a) a passenger seat frame having
        (i) a backrest support assembly including a backrest and a spreader; and
        (ii) a seat bottom support assembly; and
    (b) a rotary recline lever assembly including
        (i) an armrest connected to said spreader;
        (ii) a rotary actuator positioned within said armrest, wherein said rotary actuator includes a bushing having a contact surface of between about 25% and about 75% with respect to a shaft of rotation to provide a reduced force requirement; and
        (iii) a release cable attached between said rotary actuator and said backrest support assembly.

2. The seat system according to claim 1, including a seat back tray table attached to the back of said passenger seat frame.

3. The seat system according to claim 2, wherein said seat back tray table attached to the back of said passenger seat frame is movable between a first storage position and a second deployed position.

4. The seat system according to claim 3, including a lock mechanism attached to the back of said passenger seat frame for retaining said seat back tray table in a secured position.

5. The seat system according to claim 1, including a display is adjoined by the back of said passenger seat frame.

6. The seat system according to claim 1, including a backrest cushion attached to the backrest support assembly and a headrest.

7. In a seat system for a passenger aircraft wherein the seat system includes a passenger seat frame having (i) a backrest support assembly including a backrest and a spreader and (ii) a seat bottom support assembly, the improvement comprising a rotary recline lever assembly, said rotary recline lever assembly comprising:
    (a) an armrest connected to said spreader;
    (b) an offset rotary actuator positioned within said armrest, wherein said rotary actuator includes a low friction, square wave bushing having a contact surface of between about 25% and about 75% with respect to a shaft of rotation; and
    (c) a release cable attached between said rotary actuator and said backrest support assembly.

8. The rotary recline lever assembly according to claim 7, wherein said armrest includes a lower body and an arm cap.

9. The rotary recline lever assembly of claim 8, wherein the lower portion of said arm cap interlocks with the upper portion of said lower body.

10. The rotary recline lever assembly of claim 9, wherein the said arm cap is removably attached to the upper portion of said lower body by a fastener.

11. The rotary recline lever assembly according to claim 7, wherein said rotary actuator is offset to provide a mechanical advantage to the user.

12. The rotary recline lever assembly according to claim 7, wherein said rotary actuator further includes a pair of curved tabs to retain the proximate end of said release cable when said rotary actuator is operated by the user.

13. The rotary recline lever assembly according to claim 12, wherein said rotary actuator further includes a grooved slot adjacent to said pair of curved tabs to receive said release cable for crimped end movement to reduce side friction of said cable with its conduit when said rotary actuator is operated by the user.

14. The rotary recline lever assembly according to claim 12 wherein said rotary actuator further includes at least one mechanical stop to prevent over backwards rotation of said rotary actuator when the actuator is released by the user.

15. The rotary recline lever assembly according to claim 7, wherein said release cable further includes an outer protective jacket and a crimp on the proximate end of said release cable for engagement with said rotary actuator.

16. A seat system for a passenger aircraft, said seat system comprising:
    (a) a passenger seat frame having
        (i) a backrest support assembly including a backrest and a spreader; and
        (ii) a seat bottom support assembly;
    (b) a rotary recline lever assembly including
        (i) an armrest connected to said spreader;
        (ii) an offset rotary actuator positioned within said armrest; and
        (iii) a release cable attached between said rotary actuator and said backrest support assembly; and (c) a seat back tray table attached to the back of said passenger seat frame, and wherein said rotary actuator includes a low friction bushing having a contact surface of between about 25% and about 75% with respect to a shaft of rotation to provide a reduced force requirement to said user.

17. The seat system according to claim 16, including a seat back tray table attached to the back of said passenger seat frame, and a lock mechanism attached to the back of said passenger seat frame for retaining said seat back tray table in a secured position.

\* \* \* \* \*